(12) United States Patent
Watanabe

(10) Patent No.: US 7,429,131 B2
(45) Date of Patent: Sep. 30, 2008

(54) PORTABLE RADIOGRAPHIC IMAGING APPARATUS

(75) Inventor: Tetsuo Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/482,320

(22) Filed: Jul. 7, 2006

(65) Prior Publication Data
US 2007/0023667 A1 Feb. 1, 2007

(30) Foreign Application Priority Data
Jul. 13, 2005 (JP) ............................... 2005-203951

(51) Int. Cl.
G03B 42/04 (2006.01)
A61B 6/08 (2006.01)
(52) U.S. Cl. .................. 378/205; 378/182; 378/189
(58) Field of Classification Search ............... 378/182, 378/189, 205
See application file for complete search history.

(56) References Cited

U.S. PATENT DOCUMENTS

| 2,161,058 | A | * | 6/1939 | Kamiss | 378/188 |
| 4,303,327 | A | * | 12/1981 | LaBelle et al. | 396/522 |
| H1201 | H | * | 6/1993 | Sakuma | 378/182 |
| 5,259,016 | A | * | 11/1993 | Dickerson et al. | 378/186 |
| 5,652,781 | A | * | 7/1997 | Armbruster et al. | 378/182 |
| 5,912,944 | A | * | 6/1999 | Budinski et al. | 378/182 |
| 5,992,416 | A | * | 11/1999 | Jackson, Sr. | 128/845 |
| 6,354,737 | B1 | * | 3/2002 | Hufe et al. | 378/205 |
| 7,019,300 | B2 | | 3/2006 | Watanabe | |
| 7,092,491 | B2 | | 8/2006 | Okoda | |
| 7,180,073 | B2 | | 2/2007 | Watnabe | |
| 7,183,556 | B2 | * | 2/2007 | Yagi | 250/370.09 |
| 7,189,972 | B2 | * | 3/2007 | Ertel et al. | 250/370.11 |
| 2006/0256927 | A1 | * | 11/2006 | Meittunen | 378/182 |

FOREIGN PATENT DOCUMENTS

| CN | 1503053 A | 6/2004 |
| JP | 2002-082172 A | 3/2002 |
| JP | 2002-291730 A | 10/2002 |
| KR | 2005-0021257 | 3/2005 |

* cited by examiner

Primary Examiner—Edward J Glick
Assistant Examiner—Thomas R Artman
(74) Attorney, Agent, or Firm—Canon U.S.A., Inc. I.P. Division

(57) ABSTRACT

A portable radiographic imaging apparatus is provided which includes a system for facilitating proper alignment of a capturing section of the apparatus with a ray source while a subject is positioned therebetween. The apparatus includes a sensor having an effective capturing area which includes devices for converting rays into electrical signals; a casing enclosing the sensor; and portions formed on the casing for indicating a target capturing area aligned with and having a shape similar to the effective capturing area. A boundary of the effective capturing area is perceivable by touching the portions, thereby allowing an operator to recognize offset between the subject and the capturing section during alignment/positioning of the capturing section with respect to the subject and the ray source.

1 Claim, 7 Drawing Sheets

PORTABLE RADIOGRAPHIC IMAGING APPARATUS

BACKGROUND OF THE INVENTION

1. Field of the Invention

The present invention relates to portable radiographic imaging apparatuses using solid-state imaging devices.

2. Description of the Related Art

To date, apparatuses for capturing radiographic images of objects by emitting rays to the objects and detecting the intensity distribution of the rays that pass through the objects are well-known and have been used in industrial non-destructive inspection and medical diagnosis. One common feature of such imaging methods is the use of a film/screen for detecting rays. Such a film/screen utilizes photosensitive films and fluorescent materials having sensitivity to rays in combination. Fluorescent sheets, which emit light when irradiated with rays, are adhered to either side of the photosensitive films, and the rays passing through the objects are converted into visible light in the fluorescent sheets. The light is received by the photosensitive films, and latent images formed on the photosensitive films are developed by chemical treatment so as to be visualized.

On the other hand, methods for capturing high-definition radiographic images have come into widespread use through recent progress in digital technology. In these methods, radiographic images are converted into electrical signals, and reproduced on, for example, cathode-ray tubes (CRTs) as visible images after image processing of the electrical signals. In order to convert radiographic images into electrical signals, systems for recording and reproducing radiographic images, in which images of transmitted rays are temporarily stored in fluorescent materials as latent images, and the latent images are photoelectrically reproduced by emitting exciting light such as laser beams so as to be output as visible images, have been proposed.

Moreover, apparatuses for capturing radiographic images in the same manner using semiconductor sensors have been developed through recent progress in semiconductor processing technology. These systems have markedly wide dynamic ranges compared with the known radiographic imaging systems using photosensitive films, and have practical advantages in capturing radiographic images that are substantially insusceptible to fluctuations in exposure to rays. At the same time, the systems do not require chemical processing in contrast to the known systems using photosensitive films, and have advantages in that they enable the instant obtainment of output images.

FIG. 9 is a conceptual view of a system using such a radiographic imaging apparatus. A radiographic imaging apparatus 2 accommodating a radiation-detecting sensor 1 for detecting rays is disposed in front of a subject S, and a radiation-generating apparatus 3 is disposed behind the subject S. Rays emitted from the radiation-generating apparatus 3 pass through the subject S, are converted into visible light via fluorescent materials (not shown) in the radiation-detecting sensor 1, and then are output as electrical signals by photoelectric transducers disposed in a two-dimensional grid pattern.

The radiographic apparatus 2 is connected to a controlling section 4 that controls reading of the electrical signals obtained in the radiation-detecting sensor 1, image transfer, and the like. The controlling section 4 performs digital image processing on the image signals output from the radiation-detecting sensor 1, and displays radiographic images of the subject S on a monitor 5.

Unlike the above-described systems for recording and reproducing radiographic images that read out images during postprocessing, this system can instantly display images on the monitor 5. Such imaging systems are placed on individual stands dedicated to capturing modes of, for example, an upright position and a supine position in a radiation room so as to be separately used as required.

In general, as is disclosed in Japanese Patent Laid-Open No. 2002-291730 shown in FIG. 10, such a radiographic imaging apparatus 2 has indicators 11a to 11c and indicators 12a to 12c for indicating an area that can receive rays for forming images, the indicators being marked on the top surface of the radiographic imaging apparatus 2. When the radiographic imaging apparatus 2 is mounted on a dedicated stand (not shown), parameters such as the central positions and the focal lengths of the radiation-generating apparatus 3 and the radiographic imaging apparatus 2 can be adjusted or measured in advance.

Furthermore, systems that can automatically position both of the apparatuses by receiving of capturing specifications are also known. Moreover, in recent years, thin and lightweight portable imaging apparatuses (electronic cassettes) available for capturing wide areas and for use when visiting patients as is disclosed in Japanese Patent No. 3577003 have also been developed. These apparatuses can be used in various capturing modes to which the above-described stationary imaging systems cannot be adapted.

However, although the above-described radiographic imaging apparatus 2 of a portable cassette type can be used in various capturing positions, alignment of the subject, an effective capturing area of the radiographic imaging apparatus 2, and an irradiation area of rays largely depends on the experience and skill of operators since the radiographic imaging apparatus 2 is not fixed on a dedicated stand and lacks positioning units or accurate measurement information for the alignment. In particular, when the radiographic imaging apparatus 2 is completely hidden under the subject, operators cannot confirm the outline of the radiographic imaging apparatus 2 and positioning becomes difficult.

In order to facilitate the alignment, a radiographic imaging apparatus having a large effective capturing area may be used for reducing the influence of the positional errors. However, this may cause increases in size and weight, and may in fact impair portability and operability of the apparatus.

Instant checking and recapturing of images are easy due to the characteristics of the radiographic imaging apparatus as a digital capturing system, but it is definitely not desirable to irradiate the subject with an unnecessary amount of rays.

SUMMARY OF THE INVENTION

The present invention provides a portable radiographic imaging apparatus with which operators can easily recognize displacement (or offset) between a subject and a capturing section during alignment of the capturing section with respect to the subject.

According to one aspect of the present invention, a portable radiographic imaging apparatus is provided which includes a system for facilitating proper alignment of a capturing section of the apparatus with a ray source while a subject is positioned therebetween. The apparatus includes a sensor having an effective capturing area which includes devices for converting rays into electrical signals; a casing enclosing the sensor; and portions formed on the casing for indicating a target capturing area aligned with and having a shape similar to the effective capturing area, wherein a boundary of the effective capturing area is perceivable by touching the portions, thereby allowing an operator to recognize offset between the subject and the capturing section during alignment/positioning of the capturing section with respect to the subject and the ray source.

According to another aspect of the present of the present invention, the portions on the casing may be steps or regions having different frictional resistances disposed on at least a top or bottom surface of the casing. And, according to another aspect of the present invention, the portions on the casing may be steps or regions with different frictional resistance disposed on side surfaces of the casing.

According to another aspect of the present invention, the casing may include a grid unit disposed on the effective capturing area of the sensor, and wherein the effective capturing area of the sensor is perceivable by touching the grid unit. According to yet another aspect of the present invention, the grid unit may have steps or regions disposed on a top surface thereof having different frictional resistances for defining the target capturing area. Further, according to still yet another aspect of the present invention, the grid unit may have steps or regions disposed on side surfaces of the grid unit having different frictional resistances for defining the target capturing area.

Additionally, according to another aspect of the present invention, the steps or the regions may be partly formed on the casing along the target capturing area. And moreover, according to another aspect of the present invention, the steps may be recessed into the casing such that a level of the target capturing area is lower than exterior surfaces of the casing. Further, according to another aspect of the present invention, the steps or the regions may be formed on the side surfaces of the casing.

Furthermore, according to still yet another aspect of the present invention, the portions may be raised for improving slidability of the casing on a top or bottom surface of the casing. Also, according to another aspect of the present invention, the casing may have a recessed region into which the grid unit is fit within for positioning the grid on a top surface of the casing, and wherein the recessed region corresponds to the target capturing area.

Other embodiments, features and aspects of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate various embodiments, features and aspects of the invention, and together with the description, serve to explain the principles of the invention.

DESCRIPTION OF THE EMBODIMENTS

Numerous embodiments, features and aspects of the present invention will be described in detail in accordance with the accompanying drawings.

First Exemplary Embodiment

Figure 1:
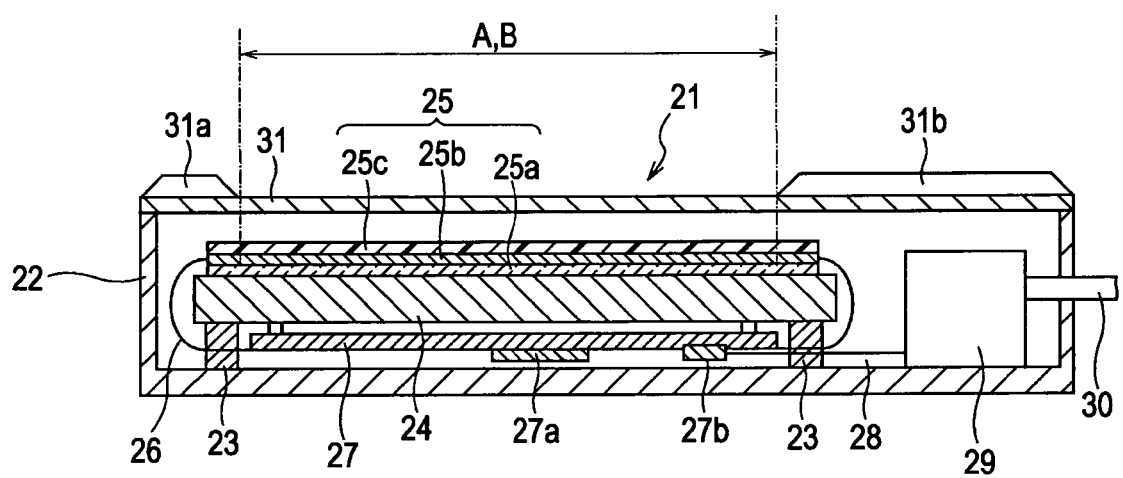
FIG. 1 is a cross-sectional view of a radiographic imaging apparatus according to a first exemplary embodiment of the present invention.
Figure 2:
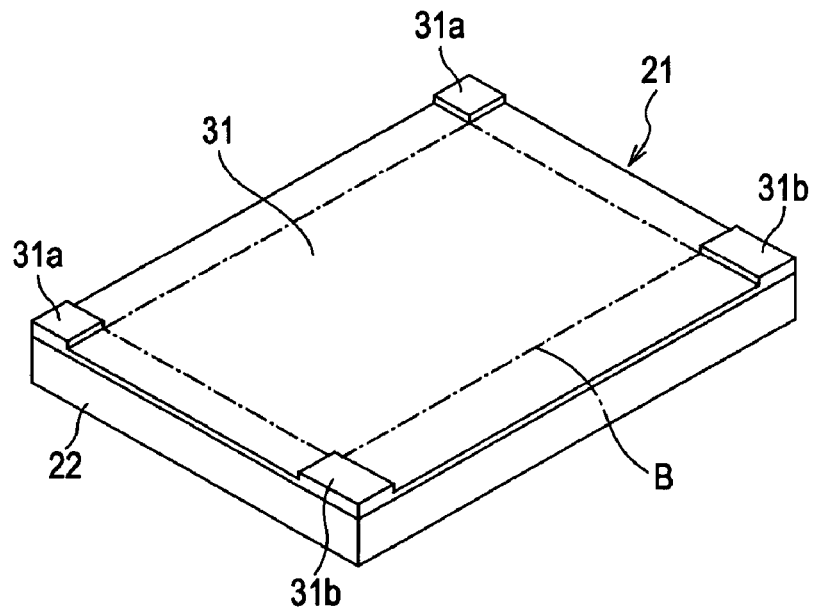
FIG. 2 is an upper perspective view of the radiographic imaging apparatus according to the first exemplary embodiment.

FIGS. 1 and 2 show a cross-sectional view and a perspective view, respectively, of a radiographic imaging apparatus according to a first exemplary embodiment of the present invention. The radiographic imaging apparatus 21 includes an open-top box-shaped casing 22 and a detection panel 25 for forming X-ray images (also referred to as "sensor") fabricated by laminating a substrate 25a, photoelectric transducers 25b, and a fluorescent plate 25c. A base 24 is fixed inside the casing 22 via a supporting portion 23, and the detection panel 25 is disposed on the base 24.

The substrate 25a is normally composed of glass since the substrate 25a is required not to exert chemical action on semiconductor devices, to endure high temperature during semiconductor processing, to be stable in dimensions, and the like. The photoelectric transducers 25b are disposed in a two-dimensional manner on the substrate 25a during semiconductor processing. The fluorescent plate 25c is formed of a resin plate and a fluorescent material of a metallic compound applied and bonded to the resin plate.

Moreover, the photoelectric transducers 25b are connected to a circuit board 27 via flexible circuit boards 26 that are connected to the sides of the photoelectric transducers 25b. Electronic components 27a and 27b for processing electrical signals that are formed by converting light energy into electrical energy are mounted on the circuit board 27. The circuit board 27 is connected to a junction electrical circuit 29 via a cable 28, and is connected to an external controller (not shown) via a cable 30 for power supply, signal transmission, and the like.

The top of the casing 22, which serves as an X-ray incident plane, is sealed with a cover 31 composed of a material having high transmittance to X-rays. The cover 31 has raised (or protruding) portions 31a and 31b at the four corners thereof. An inner area defined by the inner most edges or raised portions 31a and 31b functions as a target capturing area B that has about the same shape as an effective capturing area A of the detection panel 25 in which X rays can be detected.

Figure 3:
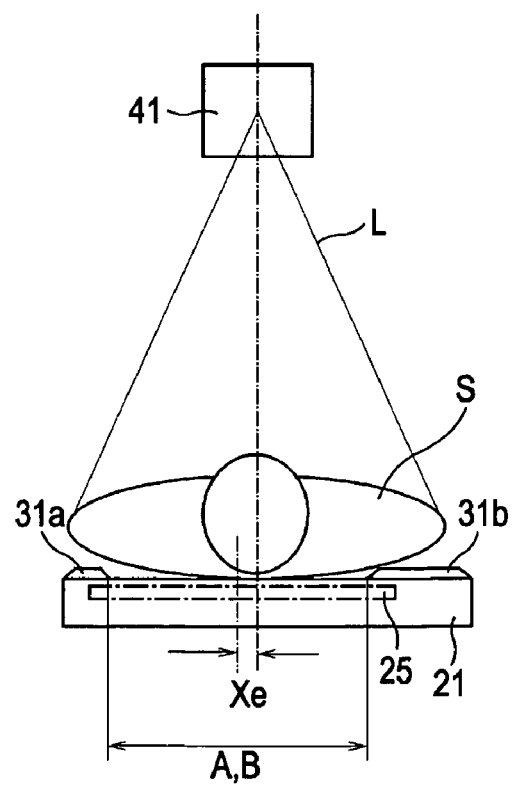
FIG. 3 is an illustration depicting the capturing of radiographic images.

FIG. 3 is an illustration depicting capturing of radiographic images using the above-described radiographic imaging apparatus 21. An X-ray tube 41 is disposed above a subject S, and the radiographic imaging apparatus 21 is disposed under the subject S. When X rays that are emitted from the X-ray tube 41 above the subject S and pass through the subject S are incident on the radiographic imaging apparatus 21, the fluorescent plate 25c of the detection panel 25 emits light. The light beams are converted into electrical signals by the photoelectric transducers 25b disposed in a two-dimensional manner. Thus, digital images can be obtained. Furthermore, the digital images can be transmitted to a monitor (not shown) via the cable 30 so as to be immediately visualized.

During capturing, the X-ray tube 41, the radiographic imaging apparatus 21, and the subject S are required to be relatively positioned in a plane parallel to the detection panel 25 inside the radiographic imaging apparatus 21 as shown in FIG. 3 such that images of desired parts are captured. If the effective capturing area A of the detection panel 25 is relatively displaced from the position of the X-ray tube 41, the irradiation area of X rays is displaced, and a part with low exposure is formed. Thus, desired images for diagnosis cannot be obtained.

Normally, the X-ray tube 41 has a light-emitting unit for indicating the irradiation field serving as a capturing area using visible light L. The irradiation area of X rays is indicated by the visible light L of a rectangular shape, and the center of the irradiation area is indicated by a cross shadow. The subject S laid on the radiographic imaging apparatus 21 is irradiated with the visible light L, and is visually positioned with respect to the X-ray tube 41.

The raised portions 31a and 31b at the four corners of the cover 31 are disposed on extensions of sides of the effective capturing area A of the detection panel 25, the sides being projected onto the cover 31, so as to demarcate the target capturing area B. The step heights of the raised portions 31a and 31b with respect to the cover 31 are set so as to be perceivable by tactile sensation of the operator's fingertips.

When the operator positions the radiographic imaging apparatus 21 with respect to the subject S, they cannot visually recognize the target capturing area B since the target capturing area B is covered by the subject S as shown in FIG. 3. Therefore, they insert their hand between the subject S and the radiographic imaging apparatus 21 so as to confirm the edges (or steps) of the raised portions 31a and 31b on the cover 31 using their fingertips. In this manner, the operator can confirm a relative displacement Xe between the subject S and the target capturing area B, and can easily perform positioning with respect to the effective capturing area A of the radiographic imaging apparatus 21.

Second Exemplary Embodiment

Figure 4:
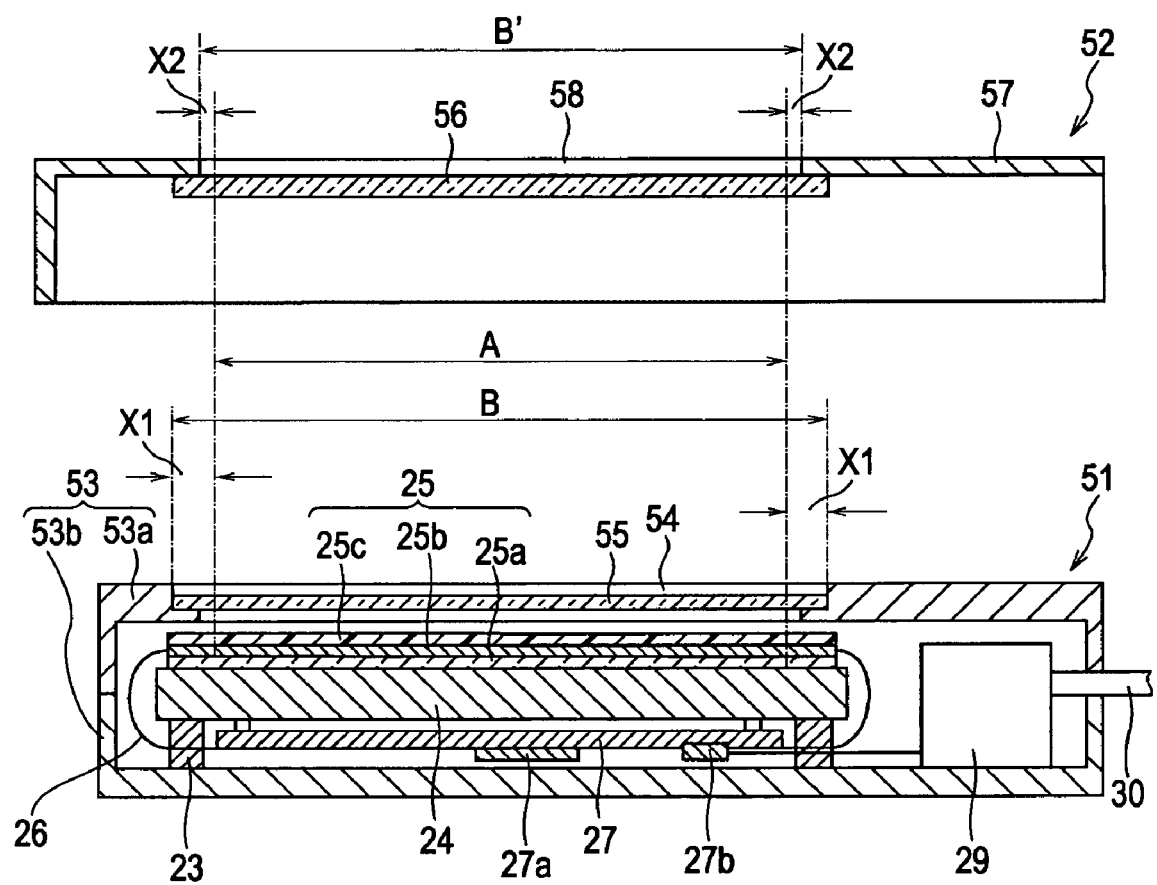
FIG. 4 is a cross-sectional view of a radiographic imaging apparatus and a grid unit according to a second exemplary embodiment of the present invention.
Figure 5:
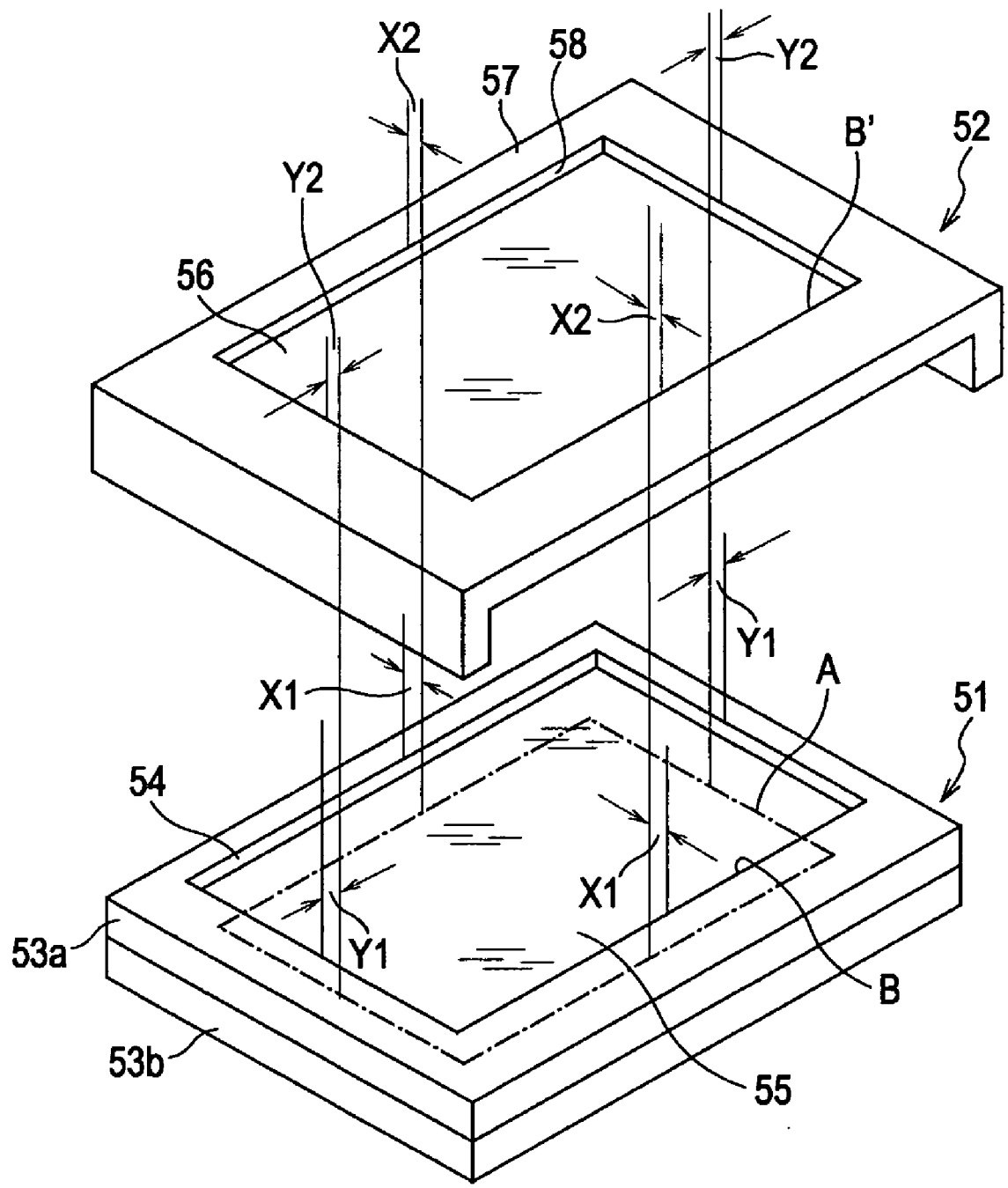
FIG. 5 is a perspective view of the radiographic imaging apparatus and the grid unit according to the second exemplary embodiment.

FIGS. 4 and 5 show a cross-sectional view and a perspective view, respectively, of a radiographic imaging apparatus 51 and a grid unit 52 coupled with the radiographic imaging apparatus 51 according to a second exemplary embodiment of the present invention. The same reference numerals are used for the same components as in the first exemplary embodiment.

A casing 53 is formed of separable casing members 53a and 53b, and accommodates a detecting unit including a detection panel 25 of the radiographic imaging apparatus 51. The casing member 53a has an opening 54 at a side adjacent to the incident plane of X rays, and a covering member 55 having high transmittance to X rays is fitted into the opening 54. The opening 54 is of a rectangular shape slightly larger than an effective capturing area A of the detection panel 25 indicated by alternate long and short dash lines, and each side of the opening 54 is longer than the corresponding side of the effective capturing area A by twice a length X1 or Y1.

The casing member 53a has a step between the top surface thereof and the covering member 55 at the opening 54. The step, which does not indicate the exact outline of the effective capturing area A but indicates a target capturing area B, allows an operator to confirm the positioning of the radiographic imaging apparatus 51 by using their fingertips. Also, since the lengths X1 and Y1 (see FIG. 5) are set to small values of the order of millimeters, the operator can safely use the opening 54 as an indication for positioning.

This radiographic imaging apparatus 51 may be used alone, or may be used with the grid unit 52 having an X-ray shielding material disposed in a striped manner. The grid unit 52 covers the radiographic imaging apparatus 51 so as to remove an influence of X rays dispersed by the human body during capturing images of the chest or the abdomen.

The recessed portion at the opening 54 corresponding to the target capturing area B in the casing member 53a of the radiographic imaging apparatus 51 is used as an indication for positioning during fitting of a grid 56 of the grid unit 52. Since the strength of the grid 56 alone is low, the grid 56 is fixed to the back surface of a frame 57 composed of sheet metal around an opening 58 of the frame 57. Similar to the opening 54 of the radiographic imaging apparatus 51, the opening 58 is of a rectangular shape, and each side thereof is longer than the corresponding side of the effective capturing area A of the detection panel 25 by twice a length X2 or Y2 (see FIG. 5). A step corresponding to the thickness of the frame 57 is formed between the top surface of the frame 57 and that of the grid 56 so as to demarcate a target capturing area B'.

Thus, similar to the target capturing area B of the opening 54 of the radiographic imaging apparatus 51, the operator can confirm the positioning of the target capturing area B' defined by the grid unit 52 by touching the edges of the opening 58 with their fingertips also when the grid unit 52 is attached to the radiographic imaging apparatus 51.

Third Exemplary Embodiment

Figure 6:
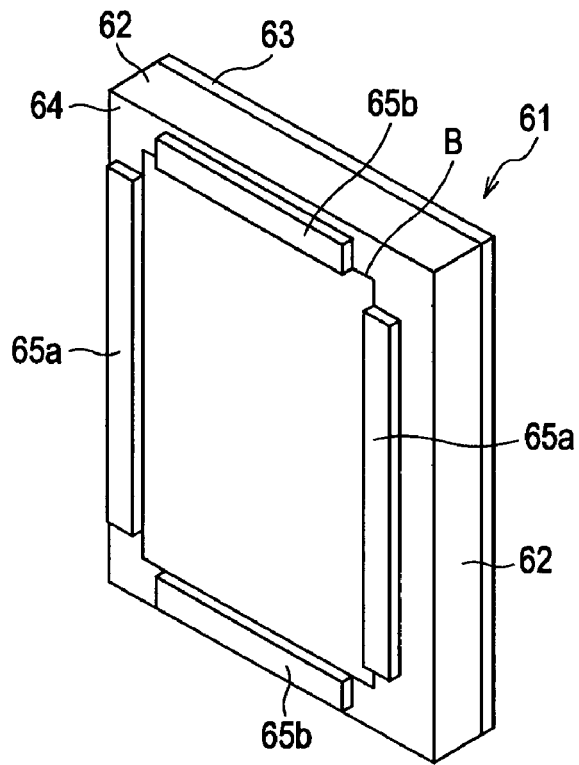
FIG. 6 is a perspective view of a radiographic imaging apparatus according to a third exemplary embodiment of the present invention.

In the first and second exemplary embodiments, protrusion, steps or the like are formed in a surface of the radiographic imaging apparatus adjacent to the incident plane. In a third exemplary embodiment, steps or raised portions are formed in the bottom surface of a radiographic imaging apparatus 61 as shown in FIG. 6. A detection panel 25 (not shown) is accommodated inside a casing 62 of the radiographic imaging apparatus 61, and a cover 63 is disposed on a side of the casing 62 adjacent to the incident plane. Strip-shaped raised portions 65a and 65b are disposed on the bottom surface 64 of the casing 62 so as to indicate the position of a target capturing area B that is defined by projecting an effective capturing area A of the detection panel 25 onto the bottom surface 64.

For example, when this radiographic imaging apparatus 61 is used on a table, the bottom surface 64 is disposed adjacent to the tabletop. If the bottom surface 64 is flat, positioning is difficult to perform due to high frictional resistance. Accordingly, the raised portions 65a and 65b serving as steps are formed on the bottom surface 64 in the third exemplary embodiment, and the contact area is reduced so as to moderate the frictional resistance.

Fourth Exemplary Embodiment

Figure 7:
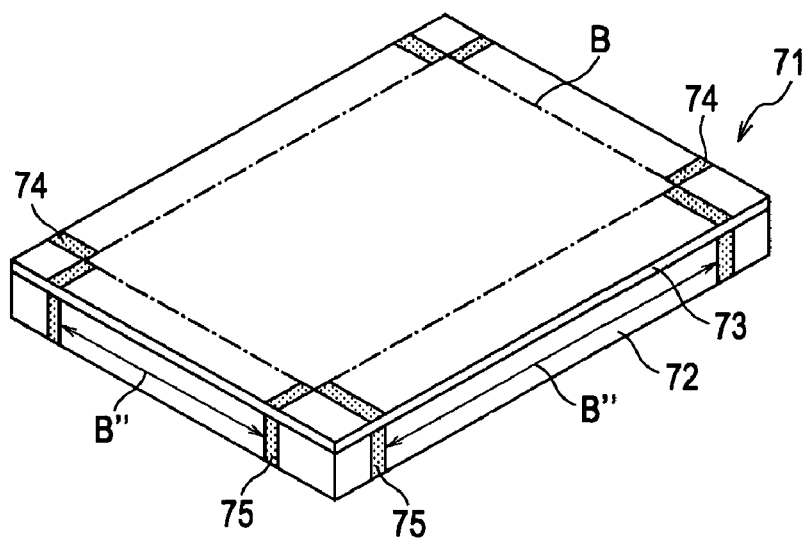
FIG. 7 is a perspective view of a radiographic imaging apparatus according to a fourth exemplary embodiment of the present invention.

FIG. 7 is a perspective view of a radiographic imaging apparatus 71 according to a fourth exemplary embodiment of the present invention. A detection panel 25 (not shown) is accommodated in a casing 72, and a side of the radiographic imaging apparatus 71 adjacent to the incident plane of X rays is covered with a cover 73 having high transmittance to X rays.

Regions 74 having high frictional coefficients are formed on the top surface of the cover 73 at positions outside an area to which an effective capturing area A of the detection panel 25 is projected so as to demarcate a target capturing area B.

In order to form these regions, surface treatment such as painting and/or coating with materials having high frictional coefficients is performed. With this, an operator can confirm the target capturing area B by recognizing the degree of friction with their fingertips instead of recognizing the difference in shape such as steps as in the first to third exemplary embodiments.

Furthermore, in addition to the incident plane of X rays, target capturing areas B" may be similarly provided at side surfaces of the casing parallel to the incoming rays by forming strip-shaped regions 75 having high frictional coefficients by surface treatment. These target capturing areas B" indicate the position of the effective capturing area A by laterally projecting the effective capturing area A. With these regions 75 at the side surfaces, the operator can perform positioning without inserting their fingers between the subject S and the radiographic imaging apparatus 71, and thus discomfort for the subject S during examination can be eased.

The method for forming indicators by use of the frictional coefficients as in the fourth exemplary embodiment is applicable not only to the surfaces of the radiographic imaging apparatus 71, but also to the side surfaces of the grid unit 52 in the second exemplary embodiment in the same manner.

Fifth Exemplary Embodiment

Figure 8:
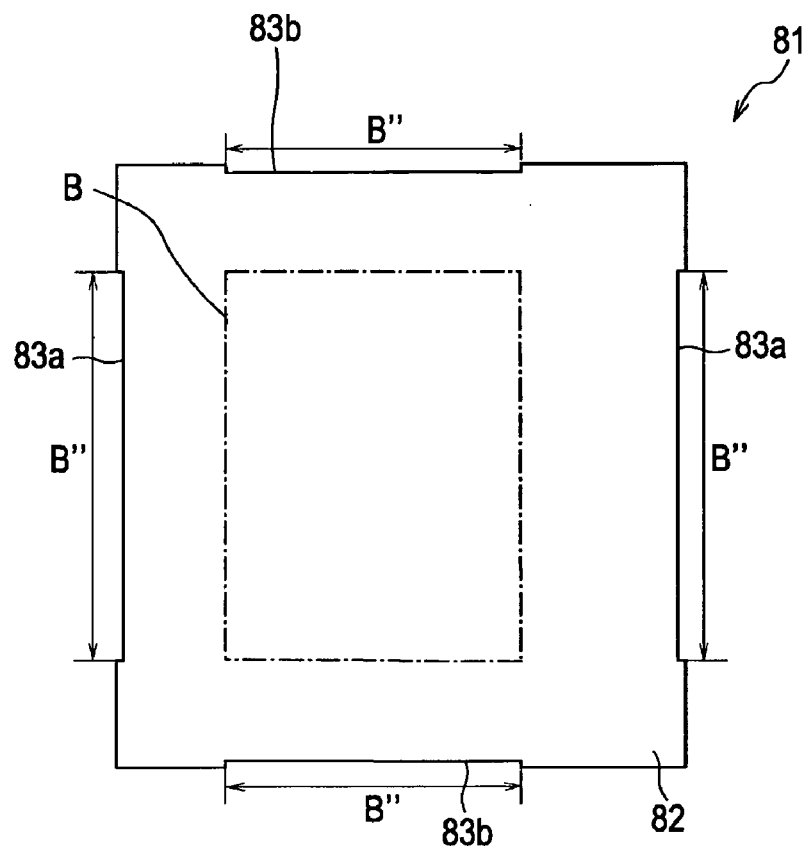
FIG. 8 is a plan view of a radiographic imaging apparatus according to a fifth exemplary embodiment of the present invention.
Figure 9:
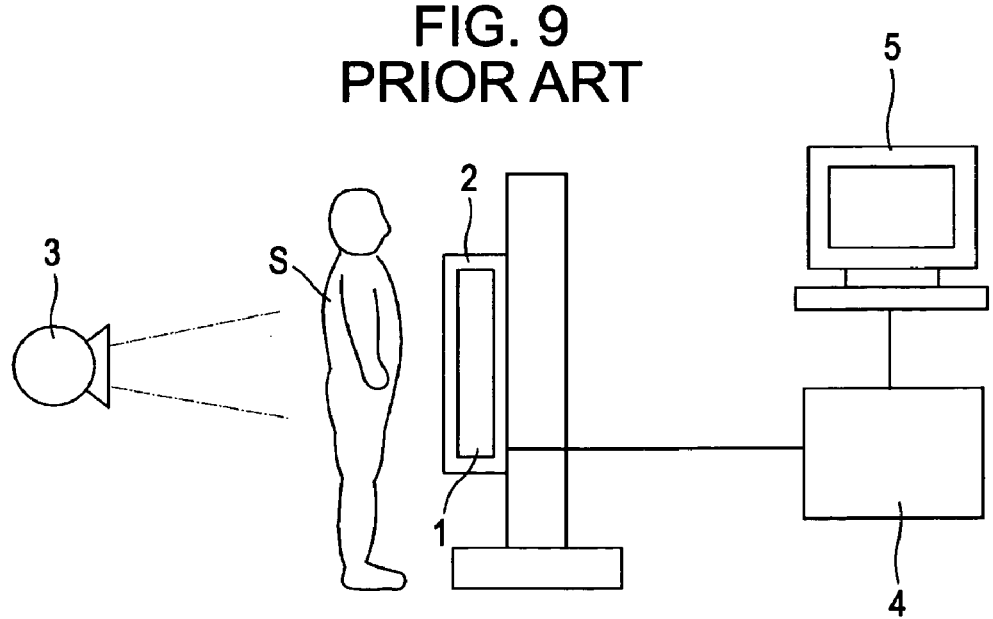
FIG. 9 is a conceptual view of a conventional system using a radiographic imaging apparatus.
Figure 10:
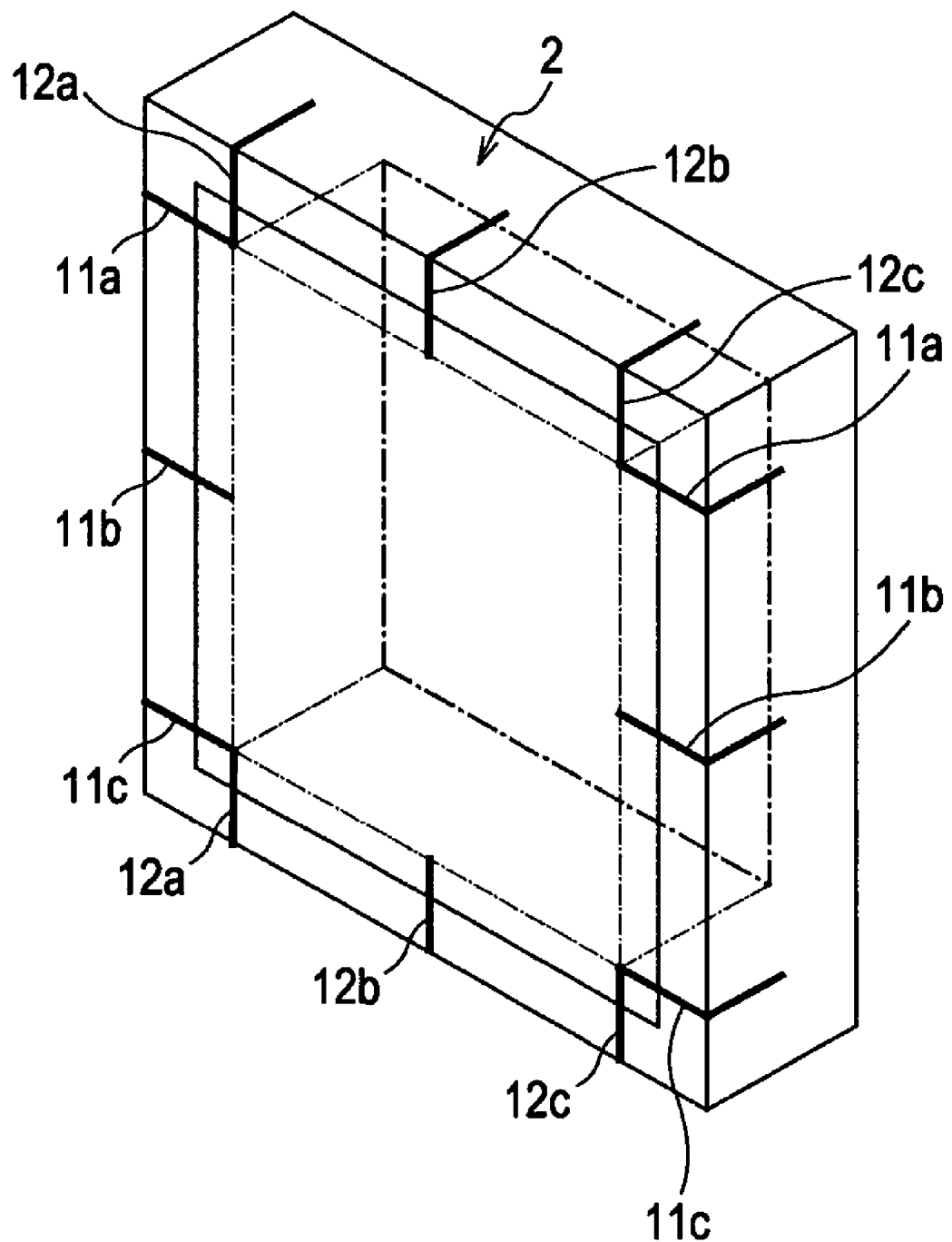
FIG. 10 is a perspective view of a conventional radiographic imaging apparatus.

FIG. 8 is a plan view of a radiographic imaging apparatus 81 according to a fifth exemplary embodiment, viewed from above the incident plane of X rays. Concave portions 83a and 83b are formed on side surfaces of a casing 82 of the radiographic imaging apparatus 81 so as to indicate the positions of target capturing areas B" by the difference in level thereof, the target capturing areas B" being defined by projecting an effective capturing area A onto the side surfaces of the casing 82 as in the target capturing areas B" in the fourth exemplary embodiment.

These steps formed in the side surfaces of the casing 82 as described above allow the operator to confirm the position of the radiographic imaging apparatus 81 without inserting their fingers between the subject S and the radiographic imaging apparatus 81, and also allows the operator to visually confirm the position.

In addition, when the radiographic imaging apparatus 81 is positioned by sliding the side surfaces thereof on a table, the presence of the concave portions 83a and 83b reduces the contact area, and thus can reduce the frictional force against the table. Such a structure is also applicable to the grid unit 52.

Other Exemplary Embodiments

The exemplary embodiments of the present invention described above may be combined with each other. Moreover, the present invention is not limited to these exemplary embodiments, and various modifications and changes are permissible within the scope and spirit of the present invention. According to the portable radiographic imaging apparatus of the present invention, reliability of the positioning accuracy, which has been dependent on experience or intuition of operators to date, may be improved, and a lightweight appropriately-sized apparatus as an entire system may be realized without increasing the effective capturing area in the capturing section. Thus, customer convenience can be enhanced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-203951 filed Jul. 13, 2005, which is hereby incorporated by reference herein in its entirety.

What is claimed is:

1. A portable radiographic imaging apparatus including a system for facilitating proper alignment of a ray capturing section of the apparatus with a ray source while a subject patient is positioned therebetween for imaging, the apparatus comprising:

a sensor for converting received rays into electrical signals, the sensor having a rectangular-shaped effective capturing area;

a rectangular box-shaped casing adapted to enclose the sensor, the casing having an open-top for receiving the sensor; and a rectangular-shaped cover adapted to be received by the open-top of the casing, the cover having an entirely flat upper radiation incident surface except for four raised rectangular portions formed on the upper surface of the cover, each raised portion having a pair of inboard side edges for indicating a perimeter defining a target capturing area substantially aligned with the effective capturing area, each inboard side edge of each pair of inboard side edges being arranged perpendicular to each other of the pair and forming an inboard corner for each raised portion, the inboard corner indicating a corner of the perimeter defining the target capturing area, the raised portions having upper beveled edges for improving slidability between the subject patient and the apparatus, wherein the perimeter of the effective capturing area is perceivable by at least one of sight or by touching the inboard side edges of the raised portions, thereby allowing an operator to recognize offset between the subject patient and the capturing section during alignment/positioning of the capturing section with respect to the subject patient and the ray source.

* * * * *